Dec. 4, 1951 R. V. POUND 2,577,540
WAVE GUIDE T BRIDGE DETECTING APPARATUS
Filed May 2, 1945 3 Sheets-Sheet 1
FIG. I
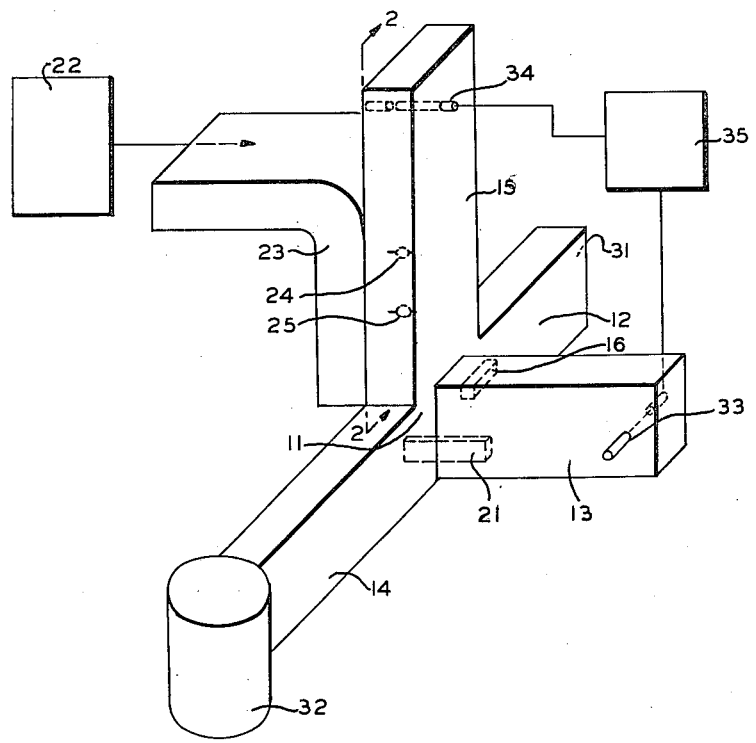
FIG. 2
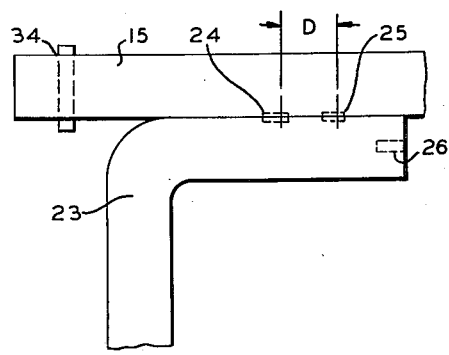
INVENTOR.
ROBERT V. POUND
BY
*William D. Hall*
ATTORNEY Dec. 4, 1951    R. V. POUND    2,577,540
WAVE GUIDE T BRIDGE DETECTING APPARATUS
Filed May 2, 1945    3 Sheets-Sheet 2

INVENTOR.
ROBERT V. POUND
BY
William D. Hall
ATTORNEY

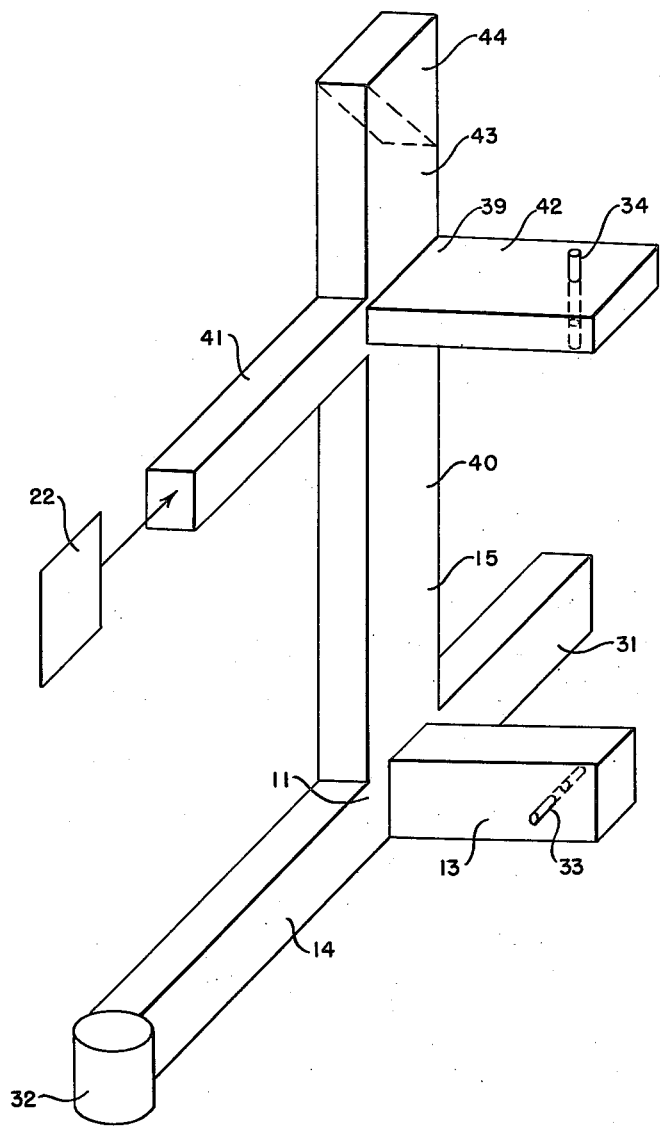

Patented Dec. 4, 1951

2,577,540

UNITED STATES PATENT OFFICE 2,577,540

WAVE GUIDE T BRIDGE DETECTING APPARATUS

Robert V. Pound, Cambridge, Mass., assignor, by mesne assignments, to the United States of America as represented by the Secretary of War Application May 2, 1945, Serial No. 591,584

6 Claims. (Cl. 172—245)

1

This invention relates to communication systems and more particularly to such systems involving frequency discriminators.

According to conventional practice one method of modulation of a radio-frequency carrier is to vary the frequency of the carrier. This is quite generally known as frequency modulation or FM. In order to ascertain the intelligence thus communicated, some means must be provided in the receiver to demodulate the radio-frequency carrier and thereby reproduce the original modulating voltage. This process is known as frequency discrimination. At the lower frequencies circuits involving tuned circuits with lumped parameters and conventional diode detectors may be used as frequency discriminators. An example of this is the so called Foster-Seeley discriminator circuit. As is well understood in the art, at the ultra high frequencies these conventional methods are no longer adequate and resort must be had to other forms of frequency discriminators.

Frequency discriminators are also used in automatic frequency control circuits and in wave meters or frequency meters.

An object of the present invention is, therefore, to provide a system for demodulating frequency-modulated radio waves in the ultra high frequency range.

Another object of the present invention is to provide a system for automatic frequency control in the ultra high frequency range.

A further object of this invention is to provide a system for measuring frequency or wavelength at the ultra high frequencies.

In accordance with the present invention there is provided a novel wave guide circuit which utilizes a matched T-bridge such as is disclosed and claimed in the copending application of Robert H. Dicke, Serial No. 581,695, filed March 8, 1945. One of the asymmetrical branches is connected to a source of radio-frequency energy by means of a directional coupler. Both of the asymmetrical branches are provided with detectors which terminate the branches in their characteristic impedances. One of the symmetrical branches is terminated in a short circuit. The remaining symmetrical branch is terminated by a resonant circuit. The distances to the two terminations of the symmetrical branches from the center of the T-bridge differ by an odd number of eighth wavelengths. The outputs of the two detectors are combined in such a manner as to utilize their difference, which is indicative of the desired quantity, namely, frequency, modulating frequency, or frequency error.

2

For a better understanding of the invention, together with other and further objects thereof, reference is had to the following description, taken in connection with the accompanying drawings, in which:

Fig. 1 is a perspective view of a preferred embodiment of the invention;

Fig. 2 is a fragmentary side view along the line 2—2 of Fig. 1 and oriented at right angles to the latter view;

Fig. 5 is a perspective view of another embodiment of the invention.

Referring now more particularly to Fig. 1, there is shown a T-bridge 11 comprising branches 12, 13, 14 and 15. The branches 12 to 15, inclusive, of the T-bridge 11 have the following relationships. The axes of the four branches meet at a common junction. A first and a second of these branches are symmetrical with respect to a plane which passes through the axes of the third and fourth branches and which plane is also perpendicular to the electric lines of force in one of the third and fourth branches. Further the third and fourth branches are so disposed that the electric lines of force therein are mutually perpendicular. The first and second branches may be called symmetrical branches while the third and fourth are called asymmetrical. Preferably the axes of the first and second branches are colinear and the axes of the third and fourth branches are mutually perpendicular to each other and to the axes of the first and second branches. In keeping with the above nomenclature, branches 12 and 14 may be considered as the first and second branches, respectively, while branches 13 and 15 are the third and fourth branches respectively, although the designations of branch numbers for purposes of explanation are not to be taken as any limitation of the invention herein described.

Figure 3:
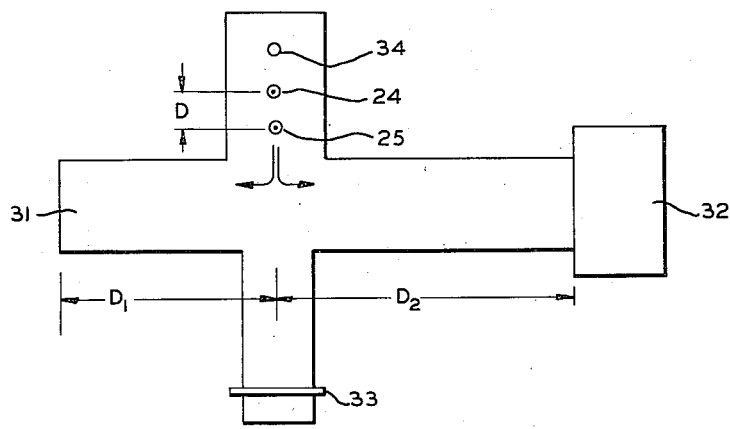
Fig. 3 is a schematic view of the invention to facilitate explanation of Fig. 1.

The T-bridge 11 also includes irises or curtains 16 and 21. The irises 16 and 21 are so arranged at the junction of the branches 12, 13, 14 and 15 and are of such dimensions that when T-bridge 11 is observed from any branch, the branch is terminated in its characteristic impedance if the other three branches are terminated in their respective characteristic impedances. The invention being described requires that the T-bridge 11 be matched over the band of frequencies with which the device is to be used. Though irises are at present considered most effective in obtaining a broad band match, other means may be used, and it is not the intent to limit the invention to the use of irises for matching. A source 22 of radio-frequency energy is connected by a directional coupler 23 to branch 15. Two coupling probes 24 and 25 are shown for coupling into the branch 15. Fig. 2 further illustrates the directional coupler 23. The probes 24 and 25 are separated by a distance D equal to an odd number of quarter wavelengths. A load 26, not shown in Fig. 1 but shown in Fig. 2, terminates the directional coupler 23. Other types of direction couplers may be used, as for example, slots instead of probes. Another method of obtaining directional coupling would be, as illustrated in Fig. 5, to use a second T-bridge 39, connecting one symmetrical branch 40 to the branch 15, connecting the source 22 to one asymmetrical branch 41, inserting the detector 34 in the remaining asymmetrical branch 42 and terminating the remaining symmetrical branch 43 in a matched load 44. In view of the many types of directional couplers which may be used, it is not the intent, therefore, to limit the invention to the type shown. The branch 12 is terminated in a short circuit 31. The branch 14 terminates in a resonant circuit 32. The resonant circuit 32 may be a cavity or a short-circuited quarter wavelength section. Branches 13 and 15 are terminated by detectors 33 and 34 which may be silicon crystals, diodes, or other amplitude converting devices. The detectors 33 and 34 are connected to an indicator 35. The branch terminations 31 and 32 are located at distances $D_1$ and $D_2$ from the center of the T-bridge 11 as shown in Fig. 3. $D_1$ and $D_2$ differ by an odd number of eighth wavelengths.

Figure 4:
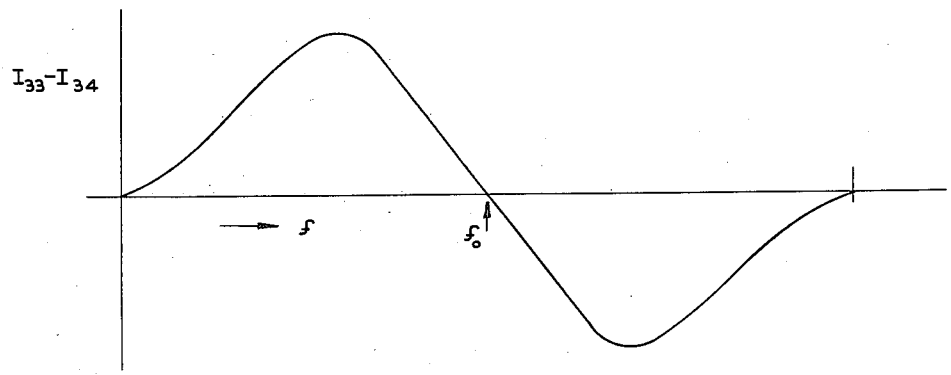
Fig. 4 is a diagram representing the variation of output current with frequency.

In operation, energy from source 22 enters branch 15 through the directional coupler 23. It will be noted from Fig. 2 that energy which passes through probes 24 and 25 will constructively interfere in such a manner as to be propagated toward the T-bridge 11, while at the same time destructively interfering to prevent propagation toward the detector 34. The energy which is not coupled into branch 15 will be absorbed by the load 26 (Fig. 2) which is of such a character that it causes no reflections, so that there will be no reflected energy to pass through the probes 24 and 25 and on to the detector 34. The energy which passes through probes 24 and 25 continues in branch 15 to the junction of T-bridge 11 where it divides equally between the branches 12 and 14. The termination 31 causes total reflection to occur. If the termination 32 acts as a pure resistance of very high value, total reflection will occur here also. This will be the case for the resonant frequency of the termination 32. The energy in branch 14 will have traveled an odd number of quarter wavelengths farther than the energy in branch 12, and these energies will combine and divide, half going into branch 15 and half into branch 13. The output of each of the detectors 33 and 34 will be proportional to the amount of energy which enters the branch in which it is mounted. It can be shown that if the frequency of the incoming energy is other than the resonant frequency of the termination 32, the termination 32 will cause a phase shift in the reflections therefrom. This additional phase shift will cause the energies, upon rearrival at the T-bridge 11, to divide unequally. If the frequency of the source 22 is varied, it can be shown that the difference in detector currents, denoted $I_{33}$—$I_{34}$, will vary as shown in Fig. 4. At the resonant frequency, $f_0$ of the termination 32, the difference will be substantially zero as shown, for small coupling to the source. For greater coupling, a frequency discrimination characteristic of the nature of the curve shown in Fig. 4 will still result, although the voltage difference at $f_0$ between the two detectors may be different from zero. This voltage difference may be made zero, if desired, for example by suitable attenuation of one of the voltages in any suitable manner.

Further, it can be shown that although the use of two detectors is preferred, demodulation will also result if the output is taken from only one of the detectors. Therefore, this invention is not limited to the use of two detectors.

The indicator 35 may be adapted to take the difference of the detector outputs and utilize this output in several ways. The output may be used as an automatic frequency control voltage. The output is indicative not only of the amount but of the direction of the error which exists between $f_0$ and the actual frequency. The output may be used to control a meter which has been calibrated in frequency or in wavelength thereby affording a direct reading frequency meter or wave meter. This output will also be indicative of the modulating signal which produced frequency modulation and this device may therefore be used as a demodulator for frequency modulated energy.

While there has been described what is at present considered the preferred embodiments of this invention, it will be obvious to those skilled in the art that various changes and modifications may be made therein without departing from the spirit of the invention.

I claim:

1. Apparatus for providing an output indicative of the frequency deviation of input microwave energy from a reference frequency, comprising a rectangular waveguide T-bridge having first and second symmetrical branches and third and fourth asymmetrical branches, said branches intersecting to form a common junction, impedance matching means in said junction, means for propagating microwave energy along said third asymmetrical branch toward said junction to cause propagation of equal components of said energy in said first and second branches, resistance means terminating said first branch for reflecting said energy toward said junction, resonance means terminating said second branch for reflecting said energy toward said junction with a phase shift which is some function of the frequency, detector means in each of said third and fourth asymmetrical branches and indicator means responsive to the output from said detector means.

2. Apparatus for providing an output indicative of the frequency variation of input microwave energy from a reference frequency, comprising a rectangular pipe waveguide T-bridge having a pair of symmetrical branches and a pair of asymmetrical branches, said branches intersecting to form a common junction, impedance matching means in said junction, directional coupling means for propagating microwave energy along one of said asymmetrical branches toward said junction to cause propagation of equal components of said energy in each of said symmetrical branches, non-reactive means terminating one of said symmetrical branches for reflecting energy toward said junction, resonance means terminating the other of said symmetrical branches for reflecting energy toward said junction with a phase shift which is some function of the frequency, said symmetrical branches differing in electrical length by an odd multiple of eighth wavelengths at the reference frequency, detector means in each of said asymmetrical branches and indicator means for comparing the outputs from said detector means.

3. Apparatus for providing an output indicative of the frequency deviation of input microwave energy from a reference frequency, comprising a rectangular pipe waveguide T-bridge having a pair of symmetrical branches and a pair of asymmetrical branches said branches intersecting to form a common junction, impedance matching means in said junction, means for propagating microwave energy along one of said asymmetrical branches toward said junction to cause propagation of equal components of said energy in each of said symmetrical branches, short circuiting means terminating one of said symmetrical branches for reflecting energy toward said junction, a resonant cavity terminating the other of said symmterical branches for reflecting said energy toward said junction with a phase shift which is some function of the frequency, said symmetrical branches differing in electrical length by an odd multiple of eighth wavelengths at the reference frequency, detector means in each of said asymmetrical branches and indicator means for comparing the outputs from said detector means.

4. Apparatus for providing an output indicative of the frequency deviation of input microwave energy from a reference frequency, comprising a rectangular waveguide T-bridge having first and second symmetrical branches and third and fourth asymmetrical branches said branches intersecting to form a common junction, impedance matching means in said junction, directional coupling means for propagating microwave energy along said third asymmetrical branch toward said junction to cause propagation of equal components of said energy in said first and second branches, resistance means terminating said first branch for reflecting said component toward said junction, resonance means terminating said second branch for reflecting said component toward said junction with a phase shift which is a function of the frequency, detector means in each of said third and fourth branches and indicator means for comparing the outputs from said detector means.

5. Microwave energy apparatus comprising a rectangular waveguide T-bridge having first and second symmetrical branches and third and fourth asymmetrical branches, said branches intersecting to form a common junction, directional coupling means for propagating microwave energy along said third asymmetrical branch toward said junction to cause propagation of equal components of said energy in said first and second branches, means terminating said first branch for reflecting said energy toward said junction, resonance means terminating said second branch for reflecting said energy toward said junction with a phase shift which is some function of the frequency, detector means in said fourth asymmetrical branch and means responsive to the output from said detector means.

6. Microwave energy apparatus comprising a rectangular waveguide T-bridge having first and second symmetrical branches and third and fourth asymmetrical branches, said branches intersecting to form a common junction, means for propagating microwave energy along said third asymmetrical branch toward said junction to cause propagation of equal components of said energy in said first and second branches, means terminating said first branch for reflecting said energy toward said junction, resonance means terminating said second branch for reflecting said energy toward said junction with a phase shift which is some function of the frequency, said symmetrical branches differing in electrical length by an odd multiple of eighth wavelengths at a given frequency of said microwave energy, detector means in said fourth asymmetrical branch and means responsive to the output from said detector means.

ROBERT V. POUND.

REFERENCES CITED

The following references are of record in the file of this patent:

UNITED STATES PATENTS

| Number | Name | Date |
| --- | --- | --- |
| 1,663,086 | Long | Mar. 20, 1928 |
| 1,711,101 | Shanck | Apr. 30, 1929 |
| 2,498,548 | Howard | Feb. 21, 1950 |